United States Patent
Bifulco et al.

(10) Patent No.: US 10,029,336 B2
(45) Date of Patent: Jul. 24, 2018

(54) ROTOR WITH BLADES SECURED BY WOVEN FIBER ATTACHMENT SYSTEM

(71) Applicant: UNITED TECHNOLOGIES CORPORATION, Farmington, CT (US)

(72) Inventors: Anthony R. Bifulco, Ellington, CT (US); Damon K. Brown, Middletown, CT (US); Nicholas Aiello, Middletown, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 273 days.

(21) Appl. No.: 14/933,129

(22) Filed: Nov. 5, 2015

(65) Prior Publication Data

US 2016/0146023 A1    May 26, 2016

Related U.S. Application Data

(60) Provisional application No. 62/084,902, filed on Nov. 26, 2014.

(51) Int. Cl.
  *B23P 15/00* (2006.01)
  *F01D 5/34* (2006.01)
  *F01D 5/28* (2006.01)

(52) U.S. Cl.
  CPC ............ *B23P 15/006* (2013.01); *F01D 5/282* (2013.01); *F01D 5/34* (2013.01); *F05D 2300/6033* (2013.01)

(58) Field of Classification Search
  CPC .......... B23P 15/006; F01D 5/282; F01D 5/34; F05D 2300/6033
  See application file for complete search history.

(56) References Cited

U.S. PATENT DOCUMENTS

| 4,334,827 A | 6/1982 | Bouiller et al. |
| 8,177,933 B2 * | 5/2012 | Foucault .................. B29C 70/68 |
| | | 156/169 |

(Continued)

FOREIGN PATENT DOCUMENTS

FR    2940353 A1    6/2010

OTHER PUBLICATIONS

English Abstract for FR2940353A1—Jun. 25, 2010; 2 pgs.
European Search Report for Application No. 15196128.1-1610—dated May 9, 2016; 6 pgs.

*Primary Examiner* — Dwayne J White
*Assistant Examiner* — Peter T Hrubiec
(74) *Attorney, Agent, or Firm* — Cantor Colburn LLP

(57) ABSTRACT

A propulsive engine rotor configured for operation within a gas turbine includes a plurality of spaced airfoil blades circumferentially affixed to an outer hoop-style rim. At least two of the airfoil blades have an integral root configured to extend either through or at least radially inwardly from the rim. A woven fiber system provides that the blade roots are interdigitally wrapped by a plurality of woven fibers before impregnation and/or encapsulation of the fibers and wrapped roots within a ceramic or other composite matrix material to form a composite ring. The composite ring defines the interior body of the rotor, includes a bore through which passes the rotational axis of the rotor, and has a lower mass than the rotor rim. The woven fiber interface between the roots increases the tensile load capacity of the airfoil blades relative to the composite ring, and increases the self-sustaining radius of the rotor.

16 Claims, 3 Drawing Sheets

(56) References Cited

U.S. PATENT DOCUMENTS

2010/0166560 A1 7/2010 Blanchard et al.
2013/0156594 A1 6/2013 Kray et al.

* cited by examiner

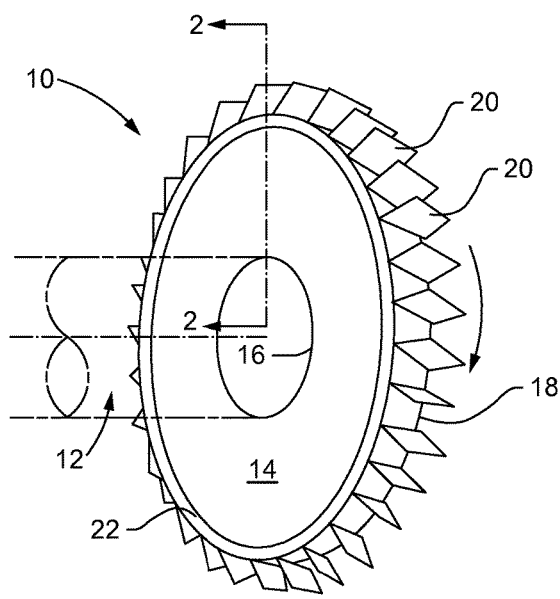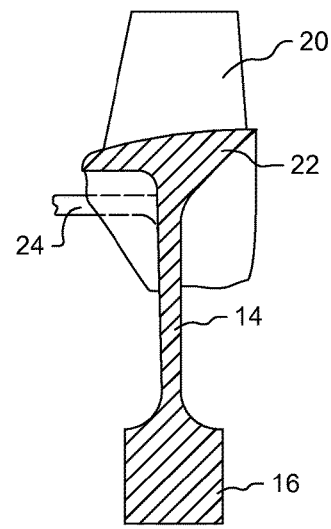
FIG.1
RELATED ART
FIG.2
RELATED ART
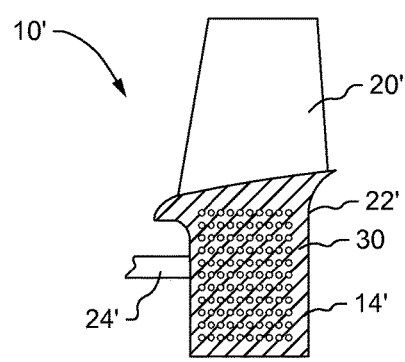
FIG.3
RELATED ART

US 10,029,336 B2

ROTOR WITH BLADES SECURED BY WOVEN FIBER ATTACHMENT SYSTEM

CROSS-REFERENCE TO RELATED APPLICATIONS

This application is a non-provisional application claiming the 35 U.S.C. § 119(e) benefit of U.S. Provisional Patent Application No. 62/084,902 filed on Nov. 26, 2014.

TECHNICAL FIELD

The present disclosure relates to composite propulsive engine rotors configured for use in gas turbine engines, and particularly to systems for securing metal airfoil blades to composite rotor structures.

BACKGROUND OF THE DISCLOSURE

Airfoil blades of turbine engines are subject to widely cyclic temperature conditions, often ranging to and exceeding 1600° F., resulting in expansions and contractions of parts, including both radial and axial displacements of the rotors. Although continuing advances in materials have enabled uses of stronger composite materials involving lower mass and requiring less physical space, there remains room for improvements.

Within a turbine engine environment, the temperature variation is compounded by a need to effectively retain the parts together radially at high rotating speeds which stress the parts, particularly when subject to high pressure differentials. Such retention of parts issue may be exacerbated when the parts are formed of different materials, particularly combinations of metallic and composite materials.

Thus, maintaining rotor integrity within the environment of a gas turbine engine may present a significant challenge to the extent that radially oriented tensile loads on airfoil blades of high-speed rotors are subject to extreme temperature and pressure fluctuations. In any event, improved bladed airfoil securement systems will permit greater uses of construction materials having lower mass, thus permitting use of thinner central body cross-sections for increasing, hence optimizing, any given self-sustaining radius of the rotor.

SUMMARY OF THE DISCLOSURE

In accordance with one aspect of the disclosure, a propulsive engine rotor includes an outer circumference defined by a plurality of airfoil blades. The blades are affixed to a circumferentially extending rotor rim having its interior secured to a radially inner composite central ring having a bore defining the rotational axis of the rotor. The plurality of blades is secured to the rotor rim by means of a woven fiber attachment system.

In accordance with a further aspect of the disclosure, the woven fiber attachment system provides for each blade to have an integrally formed root configured to extend radially inwardly of the interior of the rotor rim and toward the bore. Each of the roots is physically secured by woven fibers extending within the body of the composite ring. A plurality of fibers is interdigitally woven about and secured to each of the radially inwardly extending roots, and the fiber filaments are encapsulated within a composite matrix which forms the composite central ring. As such, the composite ring can be formed of a high strength matrix material configured to impregnate the fibers as well as the fiber-woven roots.

In accordance with another aspect of the disclosure, a woven fiber attachment system can impart greater tensile load capacity to airfoil blades secured to a propulsive engine rotor that includes a radially inner central ring formed of a composite material. The rotor includes a circumferentially extending rotor rim, and a plurality of airfoil blades affixed to the rim. The interior circumference of the rim is secured to the inner or central ring which contains a bore defining the rotational axis of the rotor. The woven fiber attachment system provides that the plurality of blades are secured to the rotor rim by woven fibers, each blade having an integrally formed root configured to extend radially inwardly of the interior of the rotor rim. As such, each root is physically secured by the woven fibers within the body of the central ring by a plurality of fiber filaments interdigitally woven about and secured to each of the radially inwardly extending roots. The fiber filaments are encapsulated within a matrix composite which forms the central ring. The attachment system results in the central ring being formed of a composite matrix material configured to impregnate the fibers as well as the fiber-encapsulated roots.

In an additional and/or alternative embodiment of any of the foregoing embodiments, the blades, roots, and rim are formed of a heat durable metal alloy.

In an additional and/or alternative embodiment of any of the foregoing embodiments, the high strength matrix material comprising the composite central ring body is a ceramic material.

In an additional and/or alternative embodiment of any of the foregoing embodiments, at least one root is bulb-shaped, and has a neck portion of a smaller circumferential dimension than the root body.

In an additional and/or alternative embodiment of any of the foregoing embodiments, a portion of the woven fibers is interdigitally secured directly to the neck of the at least one root.

In an additional and/or alternative embodiment of any of the foregoing embodiments, a portion of the woven fibers forms complete circular rings of fiber filaments about the neck of at least one root.

In an additional and/or alternative embodiment of any of the foregoing embodiments, each of the root bodies is bulb-shaped.

In an additional and/or alternative embodiment of any of the foregoing embodiments, the composite ring has a mass less than that of the rim.

In accordance with another aspect of the disclosure, the tensile load capacity of each blade is increased with respect to the rotor rim and composite ring via woven, matrix material-impregnated, fibers secured directly to the roots.

In an additional and/or alternative embodiment of any of the foregoing embodiments, a method of making a propulsive engine rotor includes the steps of machining a rotor rim and providing individual airfoil blades adapted to be secured to the rim. The steps further include machining roots on the airfoil blades to form necks of a diameter less than that of the roots. The airfoil blades are secured to the rim so that the roots extend radially inwardly from the rim.

Fiber filaments are then wound about and between adjacent necks of the blade roots, beginning at radially widest portions of the roots, and wrapping against alternative sides of consecutive roots to build up the fiber filaments. As such, the fiber filaments extend radially outwardly toward the rim to extend the fiber filaments over a portion of the necks. The wrapped or woven fiber filaments are then placed within a pressure controlled vessel and/or environment, and are then encapsulated by injecting composite matrix material into and about the fiber filaments. Finally, the fiber matrix material is cured, as by heating for example, to solidify the matrix material into a durable composite.

In an additional and/or alternative embodiment of any of the foregoing embodiments, the method may further include forming complete circular rings of fiber filaments about at least some of the necks.

These and other aspects and features of the present disclosure will be better understood in light of the following detailed description when read in light of the accompanying drawings.

BRIEF DESCRIPTION OF THE DRAWINGS

FIG. 1 is a schematic perspective view of a related art propulsive engine rotor of a type used in gas turbine engines.

FIG. 2 is a cross-sectional view of a portion of the engine rotor of FIG. 1, as viewed along lines 2-2 of FIG. 1.

FIG. 3 is a cross-sectional view of a portion of another related art engine rotor.

Figure 4:
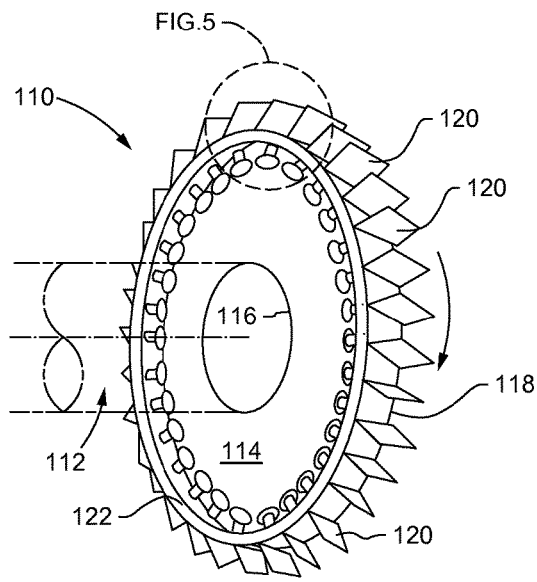
FIG. 4 is a schematic perspective view of the disclosed propulsive engine rotor.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION

Referring now to the drawings, and with initial reference to FIG. 1, a perspective view of a related art propulsive engine rotor 10 for a gas turbine (not shown) is depicted schematically. The engine rotor 10 is adapted for rotation on or about a shaft 12 (shown in phantom). A central body 14 of the rotor 10 embodies the central body mass of the rotor 10, which includes a bore 16 for support, either directly or indirectly, with respect to the shaft 12. The rotor 10 includes a circumferentially extending outer periphery 18 defined by a plurality of fixed airfoils or blades 20. The blades 20, which are also variously referred to herein as airfoil blades, are adapted to move air axially; i.e. parallel to the shaft 12.

Referring now also to FIG. 2, the blades 20 are affixed rigidly to a hoop-shaped rim 22. In the rotor 10 of FIGS. 1 and 2, a spacer arm 24, attached to the rim 22, is part of a system for coupling the rotor 10 with adjacent rotors, as will be appreciated by those skilled in the art. The particular rotor 10 of FIGS. 1 and 2 is formed as a single-piece metal alloy structure.

Referring now to FIG. 3, another related art rotor 10' is formed as a composite fiber reinforced rotor, which incorporates a composite or matrix material 30 within at least a central body 14' of the rotor 10'. The central body 14' thus includes fibers within the matrix material 30 for imparting tensile strength to the matrix material 30. The matrix material has attributes similar to those of concrete, which although strong in compression known to be is relatively weak in tension. As such, the use of steel rebar within concrete is known to impart tensile strength to a concrete matrix. Thus, the fibers of the matrix material 30 as utilized in the rotor 10' are analogous to rebar used in concrete.

In the rotor 10', the blades 20' and the rim 22' may be formed of a metal alloy, such as titanium-aluminum, while the composite central body 14' is secured to the rim 22' to produce a "hybrid" rotor 10' formed of both metal and composite structures. Because the composite material is less dense, and is actually lighter in weight than the metal, use of the lighter central body is advantageous for improving the overall self-sustaining radius of the rotor 10', a benefit in efficient rotor design known and appreciated by those skilled in the art.

Referring now to FIG. 4, an improved high-strength composite hybrid propulsive engine rotor 110 is shown schematically. The rotor 110 includes an axially extending rotational axis "a-a", shared by a shaft 112 (shown in phantom). The shaft may be configured to directly or indirectly support physical rotation of the rotor 110. The rotor 110 incorporates a woven fiber attachment system 200, as described hereinbelow in reference to FIGS. 5 and 6.

Figure 5:
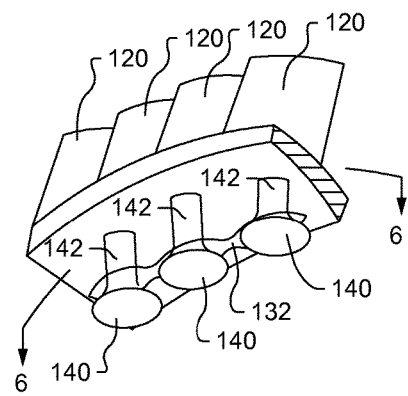
FIG. 5 is a perspective view of an encircled portion of the engine rotor of FIG. 4.

Referring now also to FIG. 5, it may be appreciated that the outer circumference of the rotor is defined by a plurality of airfoil blades 120 rigidly secured to a rim 122 having the shape of a hoop. The rim 122 has an interior circumference secured to a radially inner composite ring-shaped central body 114. To the extent that the composite central body 114 may have a mass less than that of the rim 122, the rotor 110 incorporates an effectively increased, and hence improved, self-sustaining radius than the described related art structures of FIGS. 1-3. The composite central body 114 includes a bore 116 that is coincident with and/or defines the rotational axis a-a of the rotor 110.

Figure 6:
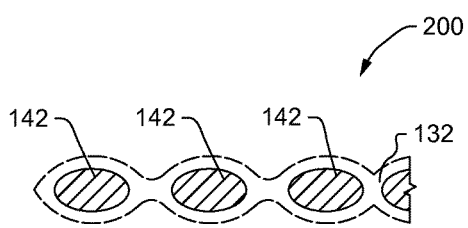
FIG. 6 is a cross-sectional view of a portion of the structure of FIG. 5, taken along lines 6-6 of FIG. 5.

In the disclosed embodiment of FIGS. 5 and 6, at least some of the airfoil blades 120 may contain bulb-shaped roots 140 that may act as physical anchors for securement of the blades and the rim 122 to the composite central body 114. For this purpose, each of the roots 140 includes a neck 142 of a smaller circumferential dimension than their associated bulb-shaped roots 140.

To the extent that a significant fail-safe challenge of rotor design is the radial retention of the high-speed rotating airfoil blades 120 in an environment subject to extreme heat, vibration, and fluctuating loads, a system of roots 140 and necks 142 can provide an integral part of a woven fiber attachment mechanism to increase tensile capacity to more securely radially retain the blades 120 on the rotor 110.

Referring now also to FIG. 6, the disclosed woven fiber attachment system 200 involves physically securing each root 140 by its neck 142 with a plurality of fiber filaments 132, interdigitally weaving the fiber filaments about and between each adjacent neck 142, so as to secure each radially inwardly extending bulb-shaped root 140 against tensile forces imposed thereon during rotation of the rotor 110. After the fiber filaments 132 are in place, they are impregnated and/or encapsulated within a high strength matrix material such as a ceramic to create the composite central body 114. Thus, the composite central body 114 is formed of a matrix material configured to impregnate the fibers to enhance tensile load capacity of the blades with respect to the rotor 110.

In the embodiment described in FIGS. 4-6, the blades 120, the blade roots 140 including the necks 142, and the rim 122 can be formed of a high strength, heat durable, metal alloy, such as a titanium aluminum, for example. On the other hand, the central body 114 is formed of a high strength matrix material, such as a ceramic material.

Figure 11:
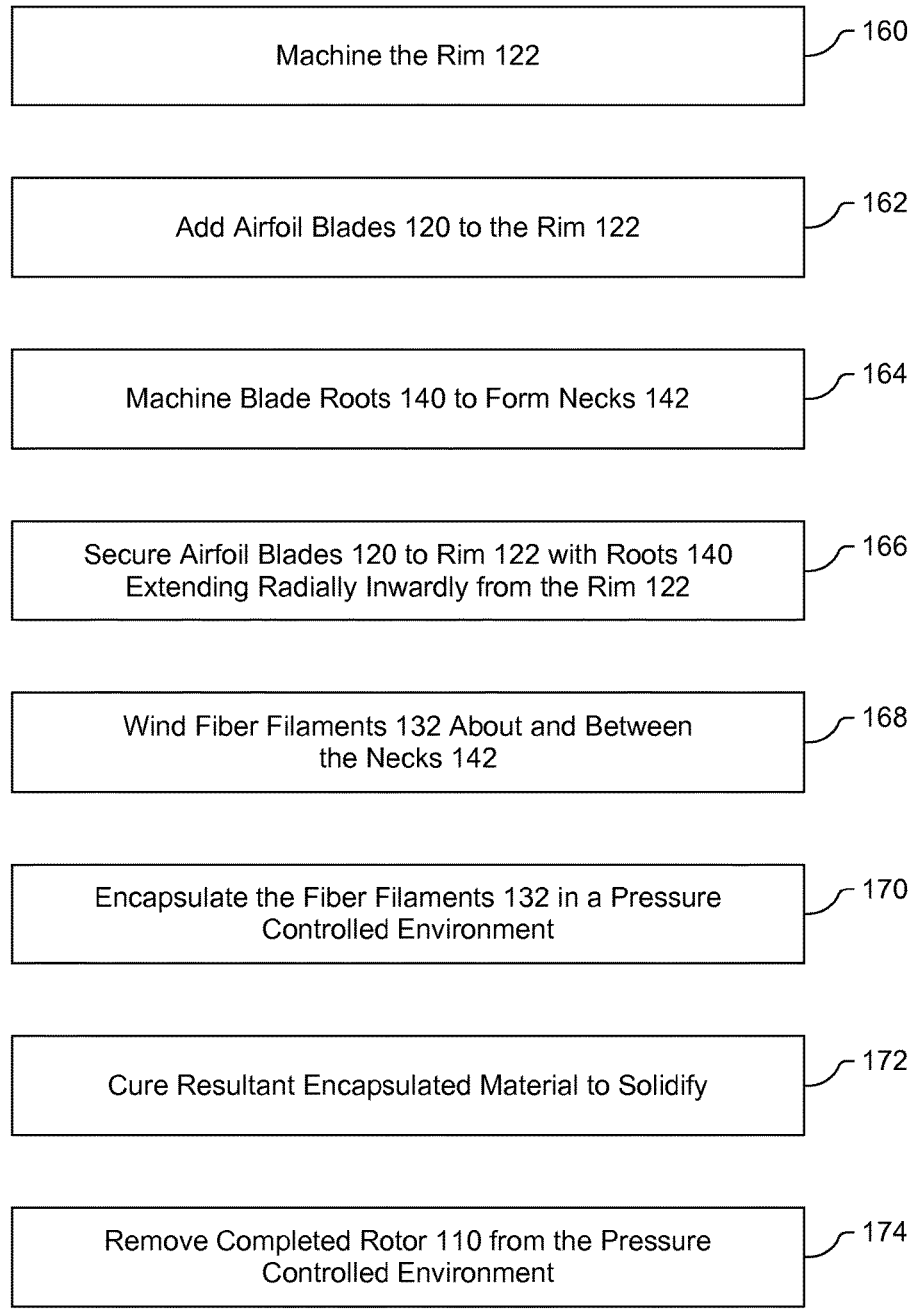
FIG. 11 is a flowchart that exemplifies one method of making the disclosed rotor.

One method of making a propulsive engine rotor 110 is exemplified in the flowchart of FIG. 11, which lists a series of sequential steps, 160, 162, et seq. for utilizing the woven fiber attachment system 200 as disclosed herein:

160) machining a rim 122;
162) providing individual airfoil blades 120 adapted to be secured to the rim 122;
164) machining the blade roots 140 so as to form necks 142 of lesser diameter than the roots 140;
166) securing the airfoil blades 120 to the rim 122 such that the roots extend radially inwardly from the rim 122;
168) winding fiber filaments 132 about and between adjacent necks 142 of the blade roots 140, beginning at the radially widest portions of the roots, and wrapping on alternate sides of consecutive roots to build up the fiber filaments radially outwardly toward the rim 122, so as to extend the fiber filaments about at least a portion of the necks 142;
170) encapsulating the wrapped fiber filaments 132 in a pressure controlled vessel and/or environment by injecting composite matrix material into and about the fiber filaments;
172) curing the fiber matrix material to solidify into composite material; and
174) removing the completed rotor 110 from the pressure controlled vessel and/or environment.

The described method may also provide for inclusion of at least several full loops of the fiber filaments 132 extending entirely circumferentially about the necks 142 of at least some of the individual roots 140. Such loops or "rings" of the fiber filaments may be interspersed with the otherwise interdigitally woven fiber filaments 132 already described above in reference to FIG. 6.

Figures 7, 8, 9, 10:
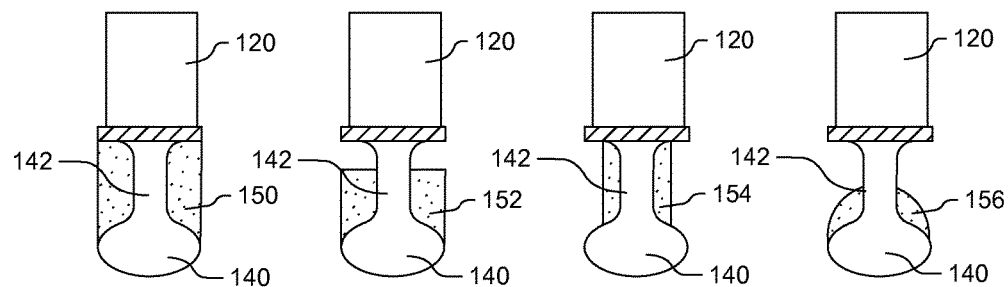
FIG. 7 is a first exemplary embodiment of the disclosed woven fiber attachment system.
FIG. 8 is a second exemplary embodiment of the disclosed woven fiber attachment system.
FIG. 9 is a third exemplary embodiment of the disclosed woven fiber attachment system.
FIG. 10 is a fourth exemplary embodiment of the disclosed woven fiber attachment system.

Referring now to FIGS. 7-10, such matrix encapsulated fiber filament structures can have alternative cross sections that appear as presented in four exemplary forms. Thus, FIG. 7 depicts a first example of a woven fiber composite arrangement 150, wherein the composite fiber matrix (e.g. a ceramic epoxy) entirely fills the spacing about the neck 142 to a thickness as wide as the bulb-shaped root 140. FIG. 8 depicts a second example of a similar woven fiber composite arrangement 152 wherein the upper portion of the neck 142 is left exposed just radially inwardly of the blade 120. FIG. 9 reflects a third example wherein a woven fiber composite arrangement 154 leaves no area of the neck 142 exposed, but is not as substantial as for example the arrangement 150 of FIG. 7. Finally, FIG. 10 depicts a fourth example in which a woven fiber composite arrangement 156 is similar to that of the arrangement 152 of FIG. 8, but has rounded contours instead of having a rectilinear shape.

Although only a few embodiments are specifically described herein, this disclosure may enable the manufacture of a rotor 110 wherein no welding or metal-to-metal bonding is required. In addition, the rotor 110 may accommodate inclusion of multiple roots or other attachments that may or may not coincide with the number of airfoil blades. The woven fibers between such attachments may extend radially inboard from either the full hoop-style circumferential rim 122 or even a hoop-style segmented rotor rim (not shown). Moreover, the built-up woven composite central body 114 may utilize self-sustaining radius aspects to control airfoil and/or rim deflections via tensile load transmission through the blade roots 140. The disclosed rotor design may enable the blades and/or rotor rim to remain as an integral separate entity apart from the woven composite central body 114. As such, for example, a failed composite central body could be replaced without affecting the rotor rim and/or the airfoil blades.

Other aspects of the rotor 110 may include the blade roots 140 having smooth contours for minimizing stress concentration in fibers after weaving and prior to encapsulation during manufacture, for example. In addition, the roots 140 may have other shapes such as a J-hook or an inverted T-hook (neither shown). Finally, the composite rotor 110 is stronger, albeit of lesser weight, thus permitting significant material reductions in both web and bore composite areas, if and as desired.

INDUSTRIAL APPLICABILITY

From the foregoing, it may be appreciated that the composite propulsive engine rotor disclosed herein may have industrial applicability in a variety of settings such as, but not limited to, use in a gas turbine engine environment. Such disclosed engine rotor may also be used, for example, in industrial or marine machines for generating thrust, or in mining applications for generating power.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A propulsive engine rotor comprising:
a rim with an annular composite ring and a plurality of circumferentially offset airfoil blades extending outwardly therefrom and integrally formed blade roots extending radially inward therefrom and has a neck of a smaller circumferential dimension than the blade roots, wherein:
a plurality of fiber filaments are interdigitally woven about and secured directly to the neck of the blade roots, the fiber filaments being encapsulated within the composite ring for securing the blades thereto.

2. The engine rotor of claim 1, wherein the roots, and rim are formed of a heat durable metal alloy.

3. The engine rotor of claim 1, wherein the composite ring is a ceramic material.

4. The engine rotor of claim 1, wherein a portion of the woven fibers forms complete circular rings of fiber filaments about the neck of the at least one root.

5. The engine rotor of claim 4, wherein each of the root bodies is bulb-shaped.

6. The engine rotor of claim 1, wherein the composite ring has a mass less than that of the rim, and is formed of a high strength matrix material configured to impregnate the fibers and the fiber encapsulated roots.

7. The engine rotor of claim 1, wherein the tensile load capacity of each blade is increased with respect to the rotor rim and composite ring via the woven, matrix material-impregnated, fibers secured directly to the roots.

8. A woven fiber attachment system for imparting greater tensile load capacity to airfoil blades secured to a propulsive engine rotor that includes a circumferentially extending rim having a radially inner central ring formed of a composite material, a plurality of circumferentially offset airfoil blades affixed to the rim and extending outwardly therefrom, the woven fiber attachment system comprising:

a plurality of integrally formed roots extending radially inwardly from the rotor rim, at least one root has a bulb-shaped body and has a neck of a smaller circumferential dimension than the bulb-shaped body; and a plurality of fiber filaments interdigitally woven about and interdigitally secured directly to the neck of the at least one root, the fiber filaments being encapsulated within the central ring for securing the blades thereto.

9. The woven fiber attachment system of claim 8, wherein the roots, and rim are formed of a heat durable metal alloy.

10. The woven fiber attachment system of claim 8, wherein the central ring is a ceramic material.

11. The woven fiber attachment system of claim 8, wherein a portion of the woven fibers forms complete circular rings of fiber filaments about the neck of the at least one root.

12. The woven fiber attachment system of claim 8, wherein each of the root bodies is bulb-shaped.

13. The woven fiber attachment system of claim 8, wherein the composite ring has a mass less than that of the rim, and is formed of a high strength matrix material configured to impregnate the fibers and the fiber encapsulated roots.

14. The woven fiber attachment system of claim 8, wherein the tensile load capacity of each blade is increased with respect to the rotor rim and composite ring via the woven, matrix material-impregnated, fibers secured directly to the roots.

15. A method of making a propulsive engine rotor, the method comprising the steps of:

a) machining a rotor rim;

b) providing individual airfoil blades adapted to be secured to the rim;

c) machining roots on the airfoil blades so as to form necks of lesser diameter than the roots;

d) securing the airfoil blades to the rim such that the roots extend radially inwardly from the rim;

e) winding fiber filaments about and directly to the necks and between adjacent necks of the blade roots, beginning at the radially widest portions of the roots, and wrapping on alternate sides of consecutive roots to build up the fiber filaments radially outwardly toward the rim, to extend the fiber filaments about at least a portion of the necks;

f) encapsulating the wrapped fiber filaments in a pressure controlled vessel and/or environment by injecting composite matrix material into and about the fiber filaments;

g) curing the fiber matrix material to solidify into composite material; and h) removing the completed rotor from the pressure controlled vessel and/or environment.

16. The method of claim 15, further comprising forming complete circular rings of fiber filaments about at least some of the necks.

* * * * *